UNITED STATES PATENT OFFICE.

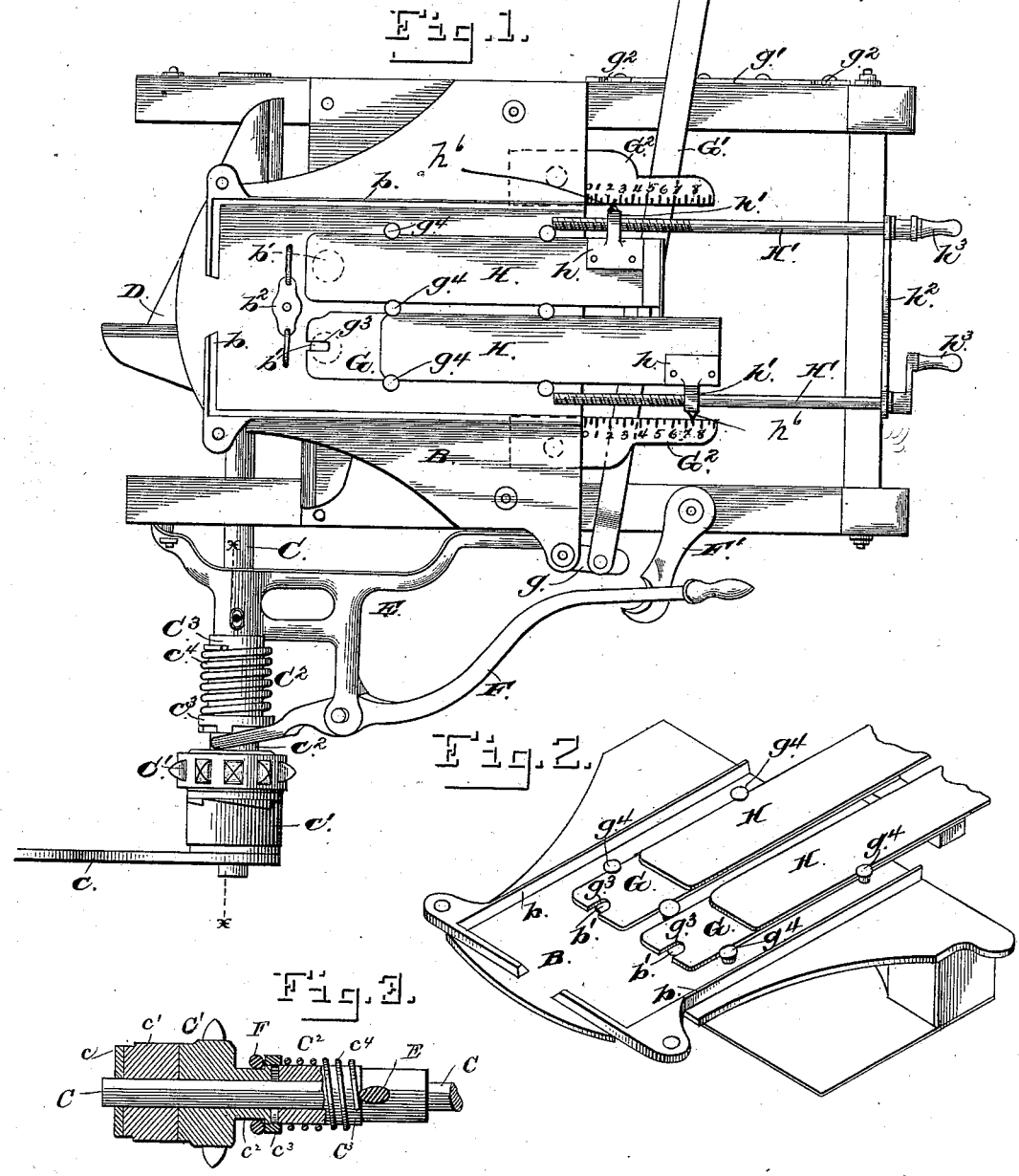

HENRY L. WHITMAN AND GUSTAVUS F. WHITMAN, OF ST. LOUIS, MISSOURI.

BROADCAST SEED-SOWER.

SPECIFICATION forming part of Letters Patent No. 373,870, dated November 29, 1887.

Application filed March 5, 1887. Serial No. 229,859. (No model.)

*To all whom it may concern:*

Be it known that we, HENRY L. WHITMAN and GUSTAVUS F. WHITMAN, citizens of the United States, residing at St. Louis, in the State of Missouri, have invented certain new and useful Improvements in Broadcast Seed-Sowers; and we do hereby declare the following to be a full, clear, and exact description of the invention, such as will enable others skilled in the art to which it appertains to make and use the same.

Our invention relates to improvements in broadcast seed-sowers; and it consists in the construction and arrangement of graduating and cut-off slides, together with an automatic spring-clutch, the operation and specific construction of which parts will be more fully hereinafter described, and pointed out in the claims.

Heretofore in machines of this class it has been found difficult to properly set the gage-slides while in operation, and in order to cut off the flow of seed it was necessary to move them out of adjustment. It has been further found that the clutches used for making connection with the power were insufficient and not positive enough in their action, as when the horses stopped or slackened their speed the machines would be thrown out of gear and required the use of the clutch-lever to put them in motion again.

Our present invention relates to an improvement on Patent No. 307,610, granted November 4, 1884.

One object of our present invention is to provide means for regulating the feed of the grain from the machine while in operation in such a manner that the amount of seed cast and the area of space covered thereby can be controlled at will.

A further abject of our invention is to provide an automatically-operating spring-clutch mechanism, which is adapted to keep the machine in gear when desired, no matter at what rate of speed the animals may be traveling, the machine always remaining in gear and ready for operation unless otherwise arranged by means of the unshipping-lever.

A further object of our invention is to provide a broadcast sower which is simple and effective in its construction and operation, strong and durable, easily handled and readily understood, positive in its desired ultimate result, and cheaply manufactured.

We attain these objects by the construction of devices shown in the accompanying drawings, wherein like letters of reference indicate similar parts in the several views, and in which—

Figure 1 represents a top plan view of our improved seed-sower, with the hopper removed. Fig. 2 is a detail perspective view of a portion of our improved machine, showing the arrangement and construction of the double set of slides; and Fig. 3 is a vertical section on the line $x\ x$ of Fig. 1.

As shown in the drawings, C represents the main driving-shaft, which revolves the distributing disk or wheel D by means of suitable gears and pinions in a well-known manner. The disk or wheel D is mounted near the end of a shaft, and is situated under the plate B, upon which the hopper is adapted to rest, receives the seed therefrom, and, by means of wings or blades formed therewith, scatters it broadcast as the said wheel D is revolved. The shaft C is provided with a pulley or sprocket-wheel, C', by which it is rotated through the intervention of a belt or chain, which in turn may be operated by the motion of the wheel or wheels of a wagon upon which the machine may be mounted, or by any other power transmitted from a suitable source.

As shown in Fig. 1, an operating handle or crank, $c$, is attached to the outer end of the main shaft C, and by which it may be operated, if desired. The said shaft is also provided with an automatically-operating spring-clutch, $C^2$. The outer end of the shaft C is provided with a collar, $c'$, which is screwed on the end of the said shaft. The inner face of the collar $c'$ is constructed with serrations, which are adapted to mesh with like serrations formed in the outer face of the sprocket C', and is adapted to transmit motion from said sprocket to the main shaft. The inner face of the sprocket C' is provided with a short recessed collar, $c^2$, formed integral therewith, the inner flange of which projects into a recess formed in the outer face of a collar, $c^3$, movably mounted on a sleeve, $C^3$, which surrounds the shaft C and forms a bearing for a coiled spring, $c^4$. This spring encircles the said sleeve $C^3$, having bearing against one portion of the supporting-bracket E of the shaft C, and at its other end bears against the movable collar $c^3$. In an arm of the bracket E a lever, F, is pivoted, the lower end of which is bifurcated and engages with the recessed portion of the collar $c^3$, while the upper end of the lever is formed with a handle and is adapted to be retained in a fixed position by a recessed link, F′, which is pivoted to the top horizontal bar or beam of the frame-work of the machine. The bifurcated end of the lever F, engaging with the recess of the collar $c^3$, affords ready means for unshipping the sprocket-wheel C′ from connection with the shaft C. When the shaft C and the sprocket C′ are placed in mesh through the medium of the engagement of the serrated collar c′ with the outer serrated face of the sprocket C′, they are retained in operative engagement by the resiliency of the coiled spring $c^4$ acting against the movable collar $c^3$, which in turn bears against the short recessed collar $c^2$ of the sprocket-wheel C′. By this means a positive engagement and connection between the shaft C and the source of power is maintained. When it is desired to disengage said parts and throw them out of connection, the lever F is pressed outward and the sprocket-wheel C′ disconnected from the collar c′, and the machine thereby disengaged from the source of power.

The plate B is formed with beveled ribs b, for the reception of the lower edge of the hopper, and also with two orifices, b′ b′, of suitable form, and a revolving agitator, $b^2$, adjacent to said orifices.

Lying horizontally on the plate B, and adapted to pass over the orifices b′, are two gage-slides, G G, for regulating the flow of the seed through said orifices or for shutting off the flow entirely. These slides G G are connected at their rear portions to an operating-lever, G′, which passes under the said slides, and is pivotally connected at one end to one side of the plate B by means of a link, g. The other end of the lever G′ extends out over the opposite side of the machine and rests on a plate, g′, secured to the frame-work, said plate g′ having recesses $g^2$ formed therein for the reception and retention of the lever when in a position to entirely or partly shut the orifices b′, as may be desired. The front ends of the slides G are provided with feed openings or slots $g^3$, so that the seed may be fed out slowly, or, in sowing the smaller grades of seed, the orifices b′ may be suitably adjusted therefor. The inner rear ends of the said slides G are cut away to form such a configuration that when they are closed entirely the ends will not in any way injure the agitator $b^2$ or impinge thereagainst. These slides G are mounted between suitable headed guide pins or studs $g^4$, which are secured to the plate B, and are adapted to cause a steady and positive movement of the said slides.

Resting on top of the gage slides G G, and also moving in and between the pins or studs $g^4$, are two cut-off slides, H H, of the same width as the gage-slides G and about the same length. The heads of the pins or studs $g^4$ project slightly over the top portions of the slides H, and thereby retain them in close engagement with the slides G.

Secured to the outer rear side of each of the slides H are small plates h, having ears or lugs h′ formed therewith, which are provided with screw-threaded apertures, and which project outwardly from the said plates beyond the edges or sides of the slides H. These screw-threaded apertured ears or lugs h′ are engaged by screw-threaded rods H′ H′, which extend back from the said ears and pass through and have bearing in a plate, $h^2$, secured to the rear top cross-beam of the frame-work of the machine.

To the outer end of the rods H′ suitable cranks or handles, $h^3$, are secured, by which the said rods H′ are revolved and the cut-off slides H consequently moved backward and forward over the gage-slides G.

The gage-slides G, as heretofore set forth, may be moved backward and forward in starting the machine by means of the lever G′, and wholly or partly close or open entire the orifices b′, as may be desired, and regulate the size of the said orifices to cause a fast or slow feed or to accommodate different grades of seed.

The cut-off slides H are adapted to be moved backward and forward while the machine is in operation and cut off the feed in whole or in part from either of the orifices as regulated by the gage-slides G. The construction and operation of the cut-off slides H is such that one orifice may be shut off entirely and the other left open, or both shut off at one and the same time, as may be found necessary for any purpose, and which will be controlled at the will of the operator. By this means the seed can be sown when desired either from one side of the machine or both sides, as may be found necessary.

Under the plate B, on each outer side of the two slides H H, two scales, $G^2$, are mounted and secured, which are engaged by an index-pointer, $h^6$, constructed with the outer ends of the lugs h′, and by means of which the quantity of seed sown will be registered, being in direct operative connection with the slides H, as shown.

By using four independent slides and adjusting them by means as described we are enabled to feed from one or both sides of the machine, and in larger or smaller quantities, as may be desired.

By the use of our improved broadcast sower equal distribution, as well as economy in the use of the seed, is obtained in an efficient and reliable manner.

It is obvious that many minor changes in the construction and arrangement of the several parts could be made and substituted for those shown and described without in the least departing from the nature and principle of our invention.

Having thus described our invention, what we claim as new, and desire to secure by Letters Patent, is—

1. In a broadcast seed-sower, two sets of slides or gates comprising four independent plates, constructed substantially as specified, arranged over each other, the one set of which is adapted to graduate the quantity of seed sown and the other to stop or permit the flow of seed upon the discharge wheel or disk, and means, substantially as described, for operating the several parts, as set forth.

2. In a broadcast seed-sower, two sets of slides or gates comprising four independent plates, constructed substantially as specified, arranged over each other and operated as described, the lower or gage slides having narrow open-ended slots formed in their ends, for the purpose set forth.

3. In a broadcast seed-sower, the combination of two sets of slides or gates comprising four independent plates, constructed substantially as specified and arranged above each other, a suitable lever attached to and operating the gage-slides, and screw-threaded rods actuated by cranks or handles engaging with and operating the cut-off slides, substantially as described.

4. In a broadcast seed-sower, the combination of the gearing for operating the several parts, a main shaft mounted in a bracket and the frame-work of the machine, and an automatically-operating spring-clutch, constructed substantially as described, mounted on the main shaft and adapted to keep the machine in gear with the power, substantially as described.

5. In a broadcast seed-sower, the combination, with the gearing for operating the several parts and a main shaft mounted in and supported by a bracket and the main frame of the machine, of a collar, $c'$, mounted on the end of the main shaft and having an inner serrated face, a sprocket-wheel, $C'$, having an outer serrated face adapted to engage with the collar $c'$ and having a collar formed with its opposite side provided with a recess and adapted to be engaged by the bifurcated end of a lever, F, a movable collar, $c^2$, mounted on a sleeve, $C^3$, and a coiled spring, $c^4$, mounted on said sleeve $C^3$, substantially as and for the purposes specified.

6. In combination with the slides H, having lugs $h'$, projecting therefrom, provided with index-pointers $h^6$, and the rods H', of scales $G^2$, secured to the frame B, and means, substantially as described, for operating said slides separately or together, whereby the quantity of seed sown may be registered, substantially as described.

In testimony whereof we affix our signatures in presence of two witnesses.

HENRY L. WHITMAN.
GUSTAVUS F. WHITMAN.

Witnesses:
W. A. STEPHENS,
N. W. PERKINS.